(12) United States Patent
Ohshima et al.

(10) Patent No.: US 7,710,515 B2
(45) Date of Patent: May 4, 2010

(54) BACKLIGHT MODULE AND LIQUID CRYSTAL DISPLAY USING THE SAME

(75) Inventors: Tetsuya Ohshima, Mobara (JP); Hitoshi Taniguchi, Yokohama (JP); Takayuki Ota, Oamishirasato (JP); Fumihiko Hieda, Oamishirasato (JP); Naotoshi Sumiya, Mobara (JP)

(73) Assignee: Hitachi Display, Ltd., Mobara-shi (JP)

( * ) Notice: Subject to any disclaimer, the term of this patent is extended or adjusted under 35 U.S.C. 154(b) by 488 days.

(21) Appl. No.: 11/527,524

(22) Filed: Sep. 27, 2006

(65) Prior Publication Data

US 2007/0076142 A1    Apr. 5, 2007

(30) Foreign Application Priority Data

Sep. 30, 2005    (JP) ............................. 2005-285835

(51) Int. Cl.
*G02F 1/1335* (2006.01)
(52) U.S. Cl. .................. 349/67; 349/64; 349/70
(58) Field of Classification Search ............. 349/112, 349/113, 58, 61, 64, 65, 70, 73, 67; 362/215
See application file for complete search history.

(56) References Cited

U.S. PATENT DOCUMENTS

| | | | |
|---|---|---|---|
| 5,720,545 A * | 2/1998 | Shaw | 362/245 |
| 6,527,414 B2 * | 3/2003 | Moon | 362/249 |
| 6,979,102 B2 * | 12/2005 | You | 362/218 |
| 7,352,418 B2 * | 4/2008 | Kim | 349/67 |
| 7,380,958 B2 * | 6/2008 | Jeong | 362/225 |
| 2003/0086255 A1 * | 5/2003 | Moon et al. | 362/97 |
| 2003/0234896 A1 * | 12/2003 | Kim | 349/65 |
| 2004/0008512 A1 * | 1/2004 | Kim | 362/235 |
| 2005/0013134 A1 * | 1/2005 | Yoo et al. | 362/235 |
| 2006/0044780 A1 * | 3/2006 | Kim | 362/29 |

FOREIGN PATENT DOCUMENTS

| | | |
|---|---|---|
| JP | 06-075216 | 3/1994 |
| JP | 2005347062 A * | 12/2005 |

* cited by examiner

*Primary Examiner*—Uyen-Chau N Le
*Assistant Examiner*—Rhonda S Peace
(74) *Attorney, Agent, or Firm*—Antonelli, Terry, Stout & Kraus, LLP.

(57) ABSTRACT

In order to solve the problem that sufficient center brightness is not always obtained in a conventional liquid crystal TV and a liquid crystal monitor, a backlight module of the invention includes a plurality of cold cathode fluorescent lamps (CFL) and a diffusing reflector below, the distance between the respective CFLs is arranged so that a central portion is narrow and an end portion is wide, and the backlight module includes a triangular sectional projection structure on at the diffusing reflector only between the CFLs between which the distance is the widest, in the end portion. According to the invention, enhancement of the center brightness without increasing consumption power, reduction in the number of CFLs, and cost reduction accompanying it are achieved.

23 Claims, 9 Drawing Sheets

BACKLIGHT MODULE AND LIQUID CRYSTAL DISPLAY USING THE SAME

BACKGROUND OF THE INVENTION

1. Field of the Invention

The present invention relates to a backlight module for a liquid crystal television and a liquid crystal monitor, and a liquid crystal display using the same.

2. Description of Related Art

Conventionally, JP-A-6-75216 discloses a liquid crystal display in which a backlight is disposed under a liquid crystal display panel, and the brightness of the backlight in a central portion of a screen of the liquid crystal display panel is made the highest and gradually reduced in a direction toward an end portion. In this liquid crystal display, there is disclosed a method of providing a bright liquid crystal display by narrowing the distance between cold-cathode fluorescent lamps (hereinafter, referred to as CFL) constituting the backlight in the central portion, and widening the distance in the end portion to enhance the center brightness without increasing power consumption while reducing the weight by decreasing the number of CFLs constituting the backlight.

BRIEF SUMMARY OF THE INVENTION

In the above liquid crystal display, while the distance between the CFLs constituting the backlight is narrow in the central portion and gradually become wider in the direction toward the end portion as described above, it is preferable to make the distance between the adjacent CFLs narrower in the central portion, and wider in the end portion in order to enhance a center brightness enhancement effect. However, if the CFL distance is made too wide in the end portion, reduction in brightness in an intermediate portion between the adjacent CFLs becomes conspicuous, which causes striated lack of brightness uniformity (or a so-called lack of tube uniformity) on the screen. In order to prevent the lack of tube uniformity from being caused, the CFL distance in the end portion is limited, and therefore a sufficient center brightness enhancement effect and an effect of reducing the number of CFLs constituting the backlight are not always obtained.

An object of the present invention is to make it possible to widen the CFL distance without causing lack of brightness uniformity in an end portion, and to realize a sufficient center brightness enhancement effect and an effect of reducing the number of CFLs.

According to the invention, a backlight module is configured so that the backlight module includes a plurality of cold cathode fluorescent lamps (CFL) and a diffusing reflector below, the distance of the respective CFLs is arranged so that a central portion is narrow and an end portion is wide, and the backlight module includes a triangular sectional projection structure on the diffusing reflector only between the CFLs between which the distance is the widest, in the end portion.

According to the invention, it is possible to widen the CFL distance without causing lack of brightness uniformity in the end portion, and to realize a sufficient center brightness enhancement effect and reduction in the number of CFLs.

Other objects, features and advantages of the invention will become apparent from the following description of the embodiments of the invention taken in conjunction with the accompanying drawings.

DETAILED DESCRIPTION OF THE INVENTION

Figure 1A:
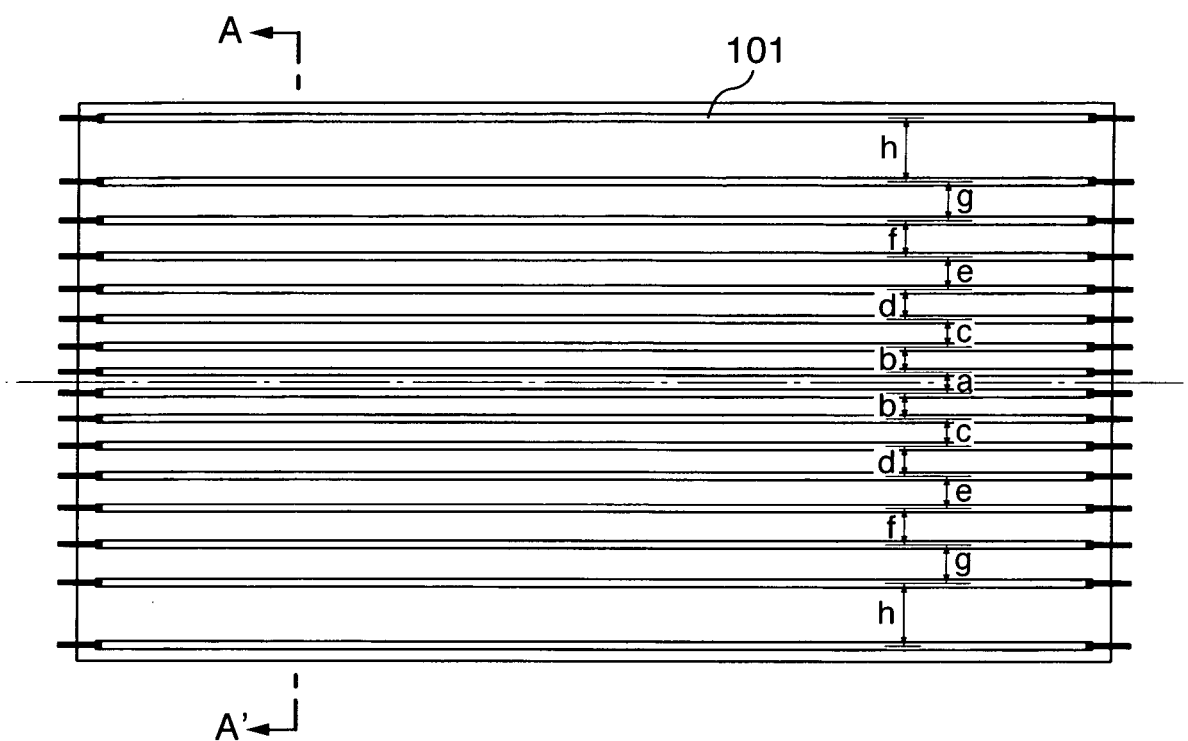
FIG. 1A is a top schematic view of a backlight module of the present invention.
Figure 1B:
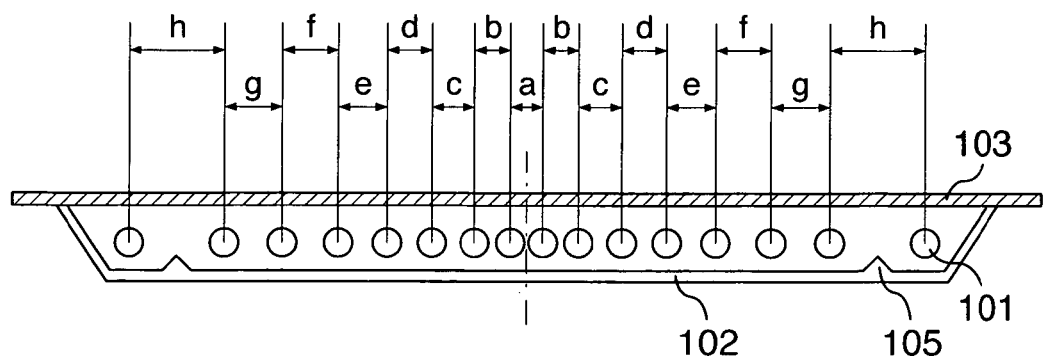
FIG. 1B is a sectional structural schematic view of the backlight module of the present invention.

FIGS. 1A and 1B show structural schematic views of a backlight module of the present invention. As shown in a top view of FIG. 1A, in this backlight module, there are arranged sixteen straight-tube-type CFLs 101 while the distance between the adjacent CFLs is narrow in a central portion, and sequentially become wider in directions toward end portions. That is, the distances a, b, c, d, e, f, g and h of the adjacent CFLs are in the following relation.

$a<b<c<d<e<f<g<h$

Namely, the CFL distance at the foremost end portions is the widest. As shown in a sectional view of FIG. 1B, a diffusing reflector 102 is disposed below the CFLs 101 to diffuse and reflect light which is emitted downward from the CFLs 101 to the above, and the light reflected by the CFLs 101 and the diffusing reflector 102 is diffused and transmitted by a transmission-type diffuser panel 103 disposed above the CFLs 101 to illuminate a liquid crystal panel. Here, it is preferable to make the diffusing reflector 102 so that a triangular sectional portion is provided at an end portion at which a CFL disposed area is divided into three, and the triangular sectional portion is not provided in the central portion. In this case, the triangular sectional portion 105 having a triangular sectional projection structure is formed only in a region in the end portion where the CFL distance is the widest. The triangular sectional portion 105 reflects a light ray diffused and reflected at a low angle by the diffusing reflector 102 toward an upside, and therefore, has an effect of enhancing brightness in the vicinity of the region where the triangular sectional portion 105 is disposed. Therefore, by disposing the triangular sectional portion 105 in an intermediate portion between the CFLs in the end portion as shown in FIG. 1B, the brightness of this portion is enhanced and the CFL distance h can be widened without causing lack of tube uniformity. As a result, the CFL distance in the central portion can be arranged to be narrower, and therefore, a sufficient center brightness enhancement effect can be obtained.

Figure 2A:
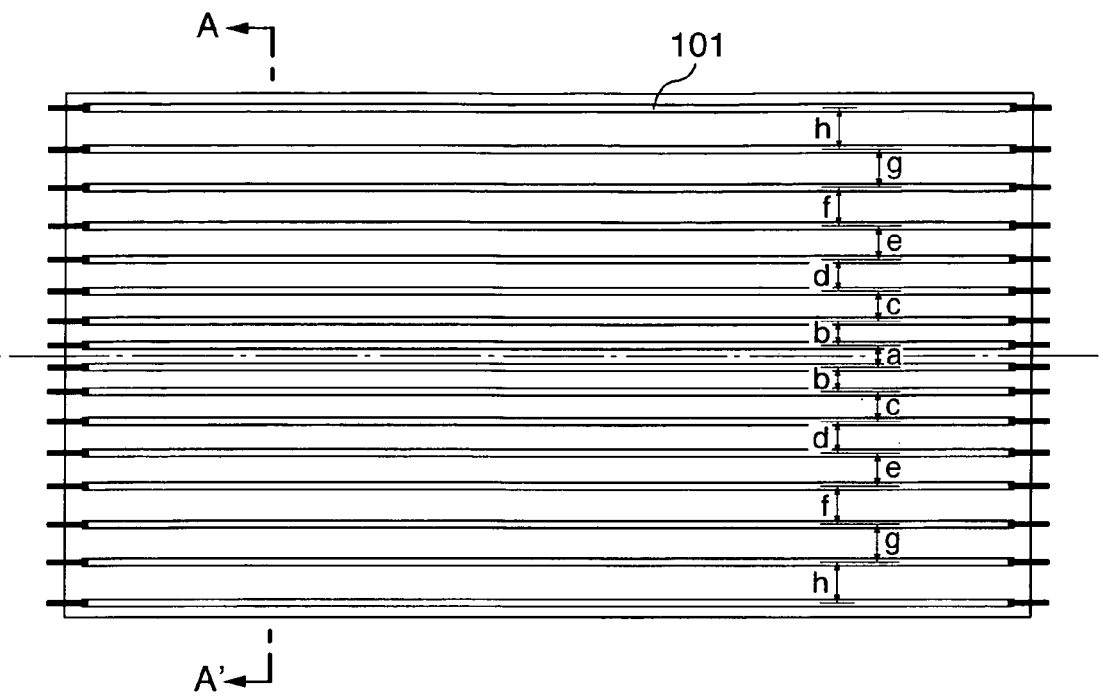
FIG. 2A is a top schematic view of a backlight module of a prior art.
Figure 2B:
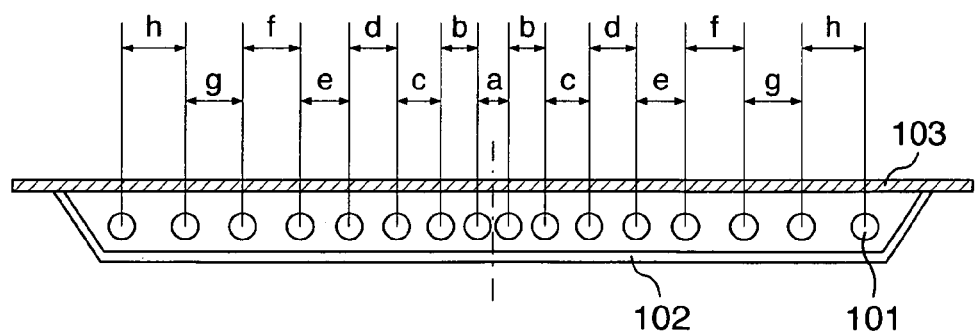
FIG. 2B is a sectional structural schematic view of the backlight module of the prior art.
Figure 3:
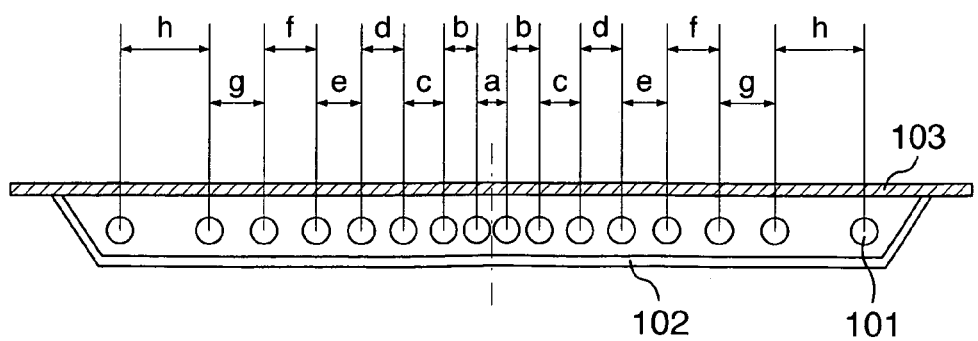
FIG. 3 is a sectional structural schematic view of a backlight module of the prior art.
Figure 11:
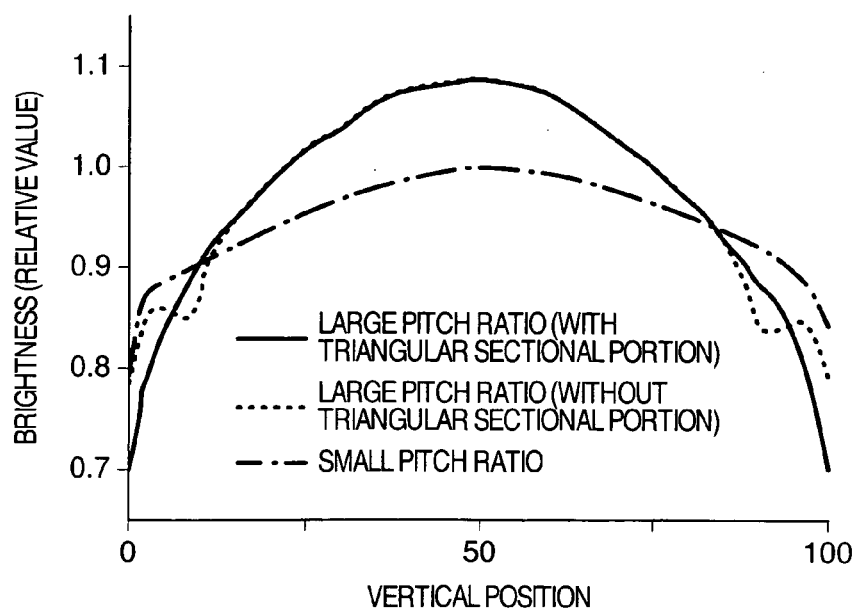
FIG. 11 shows brightness distribution characteristics of the backlight modules of the present invention and the prior art.

The effect will be explained using a brightness distribution shown in FIG. 11. In a conventional case which does not have the triangular sectional portion, when the CFLs are arranged under the condition that lack of tube uniformity in the end portion is not observed (the structure thereof is shown in FIGS. 2A and 2B), the ratio of the CFL distance "a" in the central portion and the CFL distance "h" in the end portion (namely, the pitch ratio) is small, and thereby a sufficient center brightness enhancement effect is not obtained as shown by an alternate long and short dash line. Meanwhile, when the pitch ratio is made large (the structure thereof is shown in FIG. 3), a sufficient center brightness enhancement effect is obtained as shown by a broken line, but lack of tube uniformity occurs at the end portions. Contrary to this, according to the present invention, by disposing the triangular sectional portions in the end portions of the diffusing reflector, a high brightness enhancement effect can be obtained without causing lack of tube uniformity in the end portions as shown by a solid line.

Figure 4:
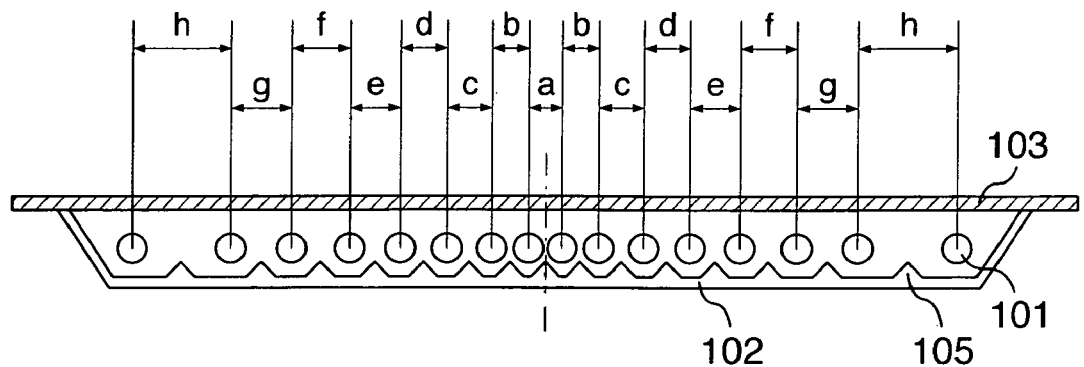
FIG. 4 is a sectional structural schematic view of a backlight module of the prior art.
Figure 12:
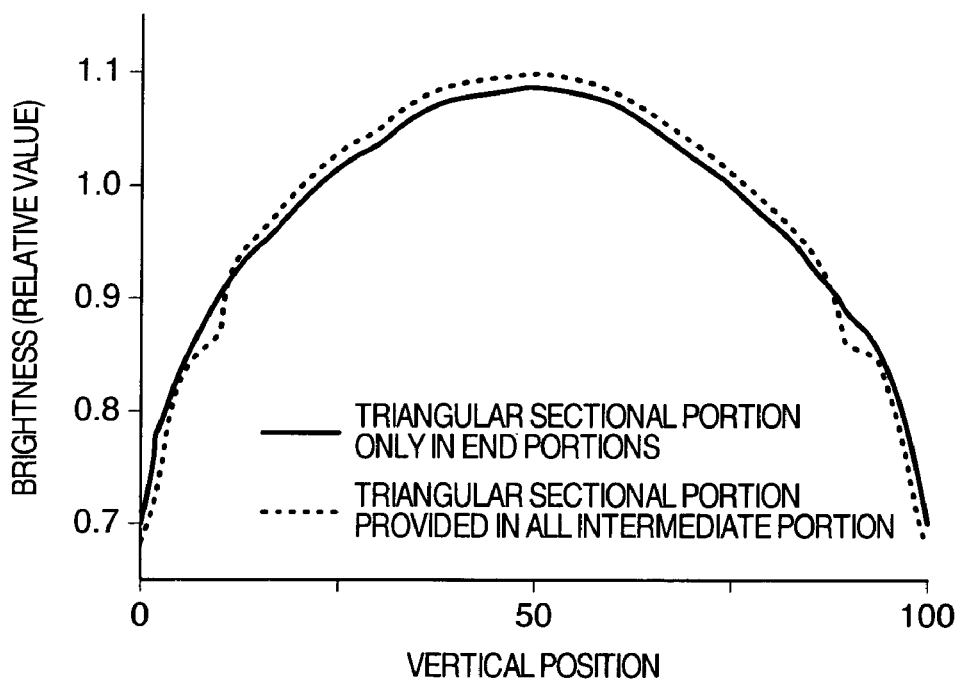
FIG. 12 shows brightness distribution characteristics of the backlight modules of the present invention and the prior art.

In order to obtain the high center brightness enhancement effect by configuring the large pitch ratio without lack of tube uniformity as describe above, it is preferable that the reflector disposed below the CFLs is a diffusing reflector having a diffusing property, and the triangular sectional portions provided in the diffusing reflector is provided only in the end portions where the CFL distance is large. FIG. 12 shows the brightness distribution comparison of the case where the triangular sectional portions are provided in all intermediate portions of the CFLs as shown in FIG. 4, and the case where the triangular sectional portions are provided only in the end portions as shown in FIGS. 1A and 1B, with the same CFL distance. It is recognized that when the triangular sectional portions are provided in all the middle portions of the CFLs, brightness in the portions other than the end portions increases a little, but an effect of improving lack of tube uniformity in the end portions becomes small and a desired effect cannot be obtained as compared with the case where the triangular sectional portions are provided only in the end portions. This is because the light ray between the CFLs and the diffusing reflector diffuses and is reflected upward due to the triangular sectional portions on the way, and the amount of light which reaches the end portions is decreased. In order to obtain a sufficient effect of improving lack of tube uniformity as described above, it is preferable to provide the triangular sectional portions only in the end portions where the CFL distance is wide.

Figure 5:
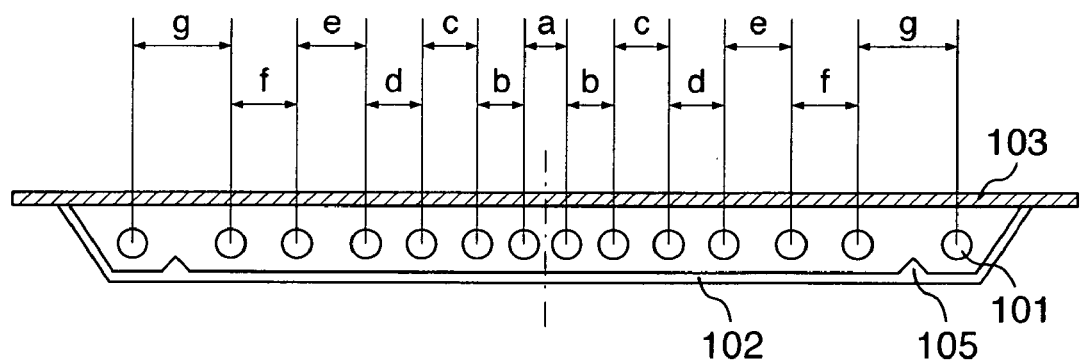
FIG. 5 is a sectional structural schematic view of a backlight module of the present invention.
Figure 6:
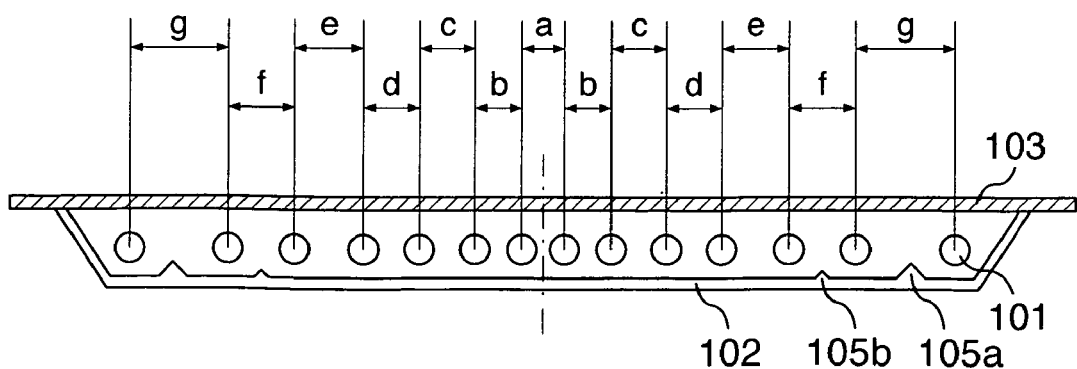
FIG. 6 is a sectional structural schematic view of a backlight module of the present invention.
Figure 7A:
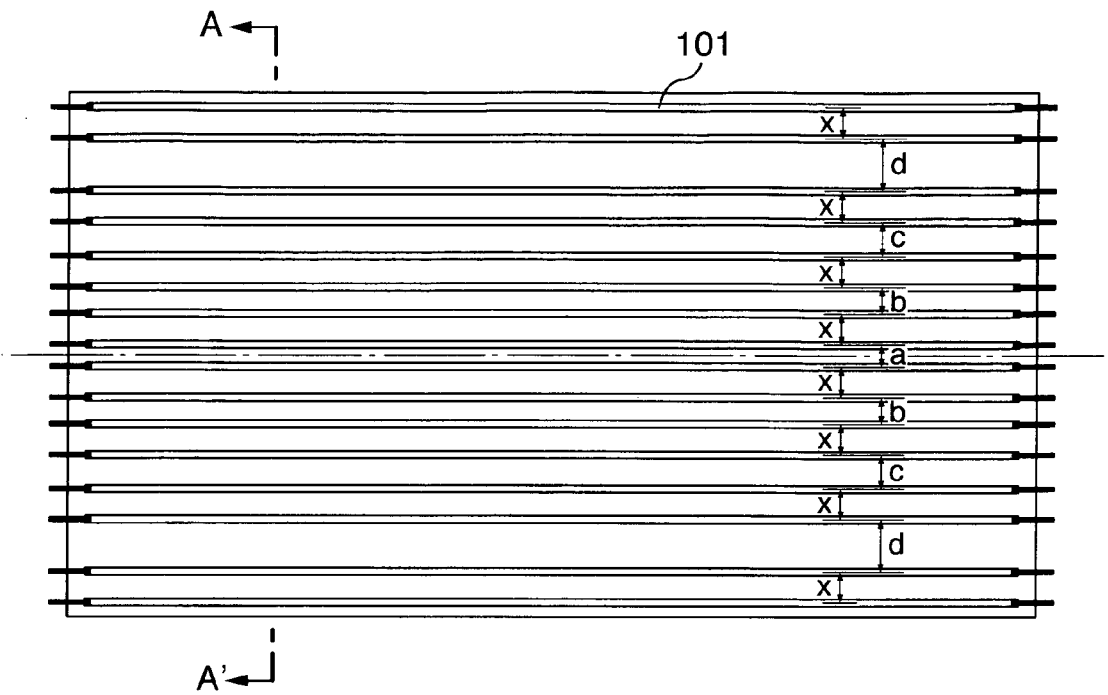
FIG. 7A is a top schematic view of a backlight module of the present invention.
Figure 7B:
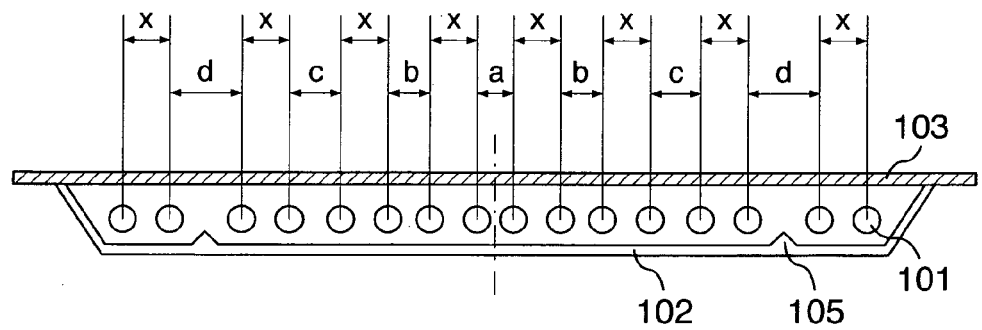
FIGS. 7B is a sectional structural schematic view of the backlight module of the present invention.

While the brightness enhancement effect is described above, the distance between the CFLs in the end portions can be made wide by disposing the triangular sectional portions and therefore, the number of CFLs can be reduced. The brightness ratio of the central portion and the end portion is substantially in inverse proportional relation to the distance between the CFLs. Therefore, in order to obtain the same center brightness enhancement effect with a smaller number of CFLs in the CFL disposition area, the distance between CFLs become wide in inverse proportion to the number of CFLs. Since lack of tube uniformity hardly occurs even if the distance between CFLs is wide as a result of disposing the triangular sectional portions in the end portions, the center brightness enhancement effect can be obtained even if the number of CFLs is reduced. When the number of CFLs is 14 as shown in FIG. 5, the brightness enhancement effect which is the same as or more than the case that the number of CFLs is 16 in the prior art can be obtained. When the pitch ratio of the CFLs is further increased, lack of tube uniformity sometimes may occur in the next widest portion to the end portions. In this case, it is preferable to provide the triangular sectional portions also at this portion as shown in FIG. 6. In this case, in order to ensure a sufficient amount of light which reaches the triangular sectional portions 105$a$ in the foremost end portions as described above, it is preferable to make the height of the triangular sectional portion in the second widest portion lower as compared to the widest portion.

Figure 8:
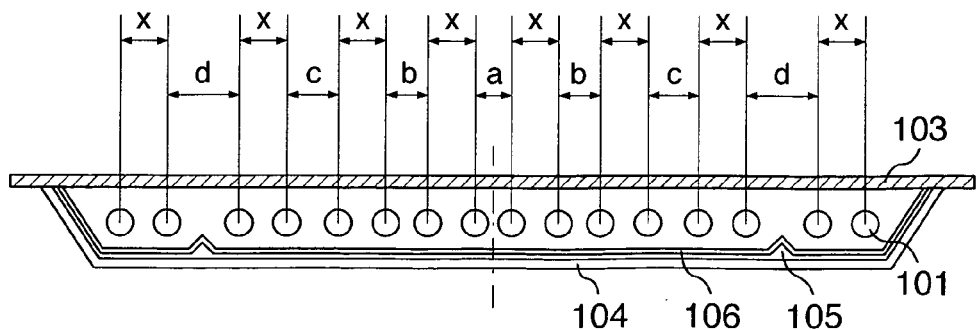
FIG. 8 is a sectional structural schematic view of a backlight module of the present invention.

While the case where the distance between the CFLs is changed at each CFL is described above, the distance between the respective pairs of CFLs may be changed while keeping the distance in each pair constant. An example thereof is shown in FIG. 8. Here, 16 CFLs are made into bundles each of which include two CFLs, while its distance is set constant by X, to make 8 bundles. The distances a, b, c and d between the bundles are in the following relation.

$$a<b<c<d$$

Figure 14:
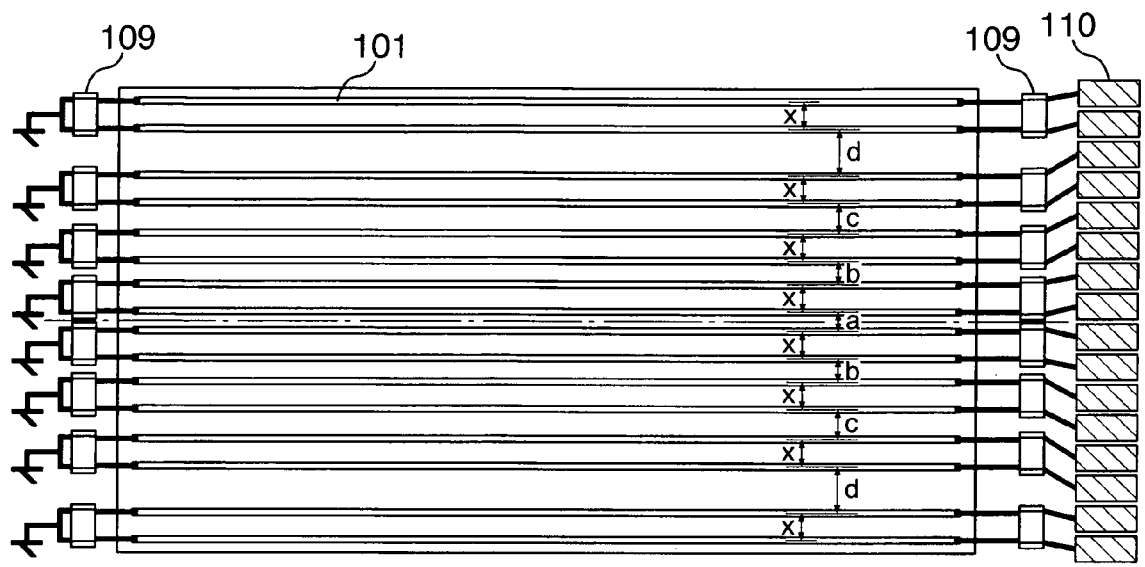
FIG. 14 is a top structural schematic view of a backlight module of the present invention.
Figure 15:
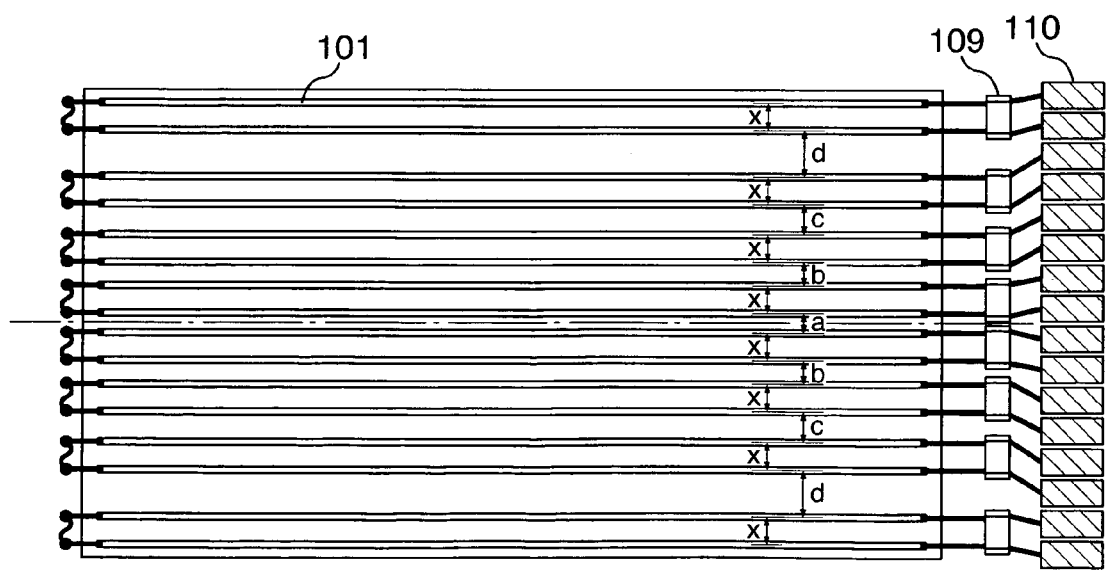
FIG. 15 is a top structural schematic view of a backlight module of the present invention.
Figure 16:
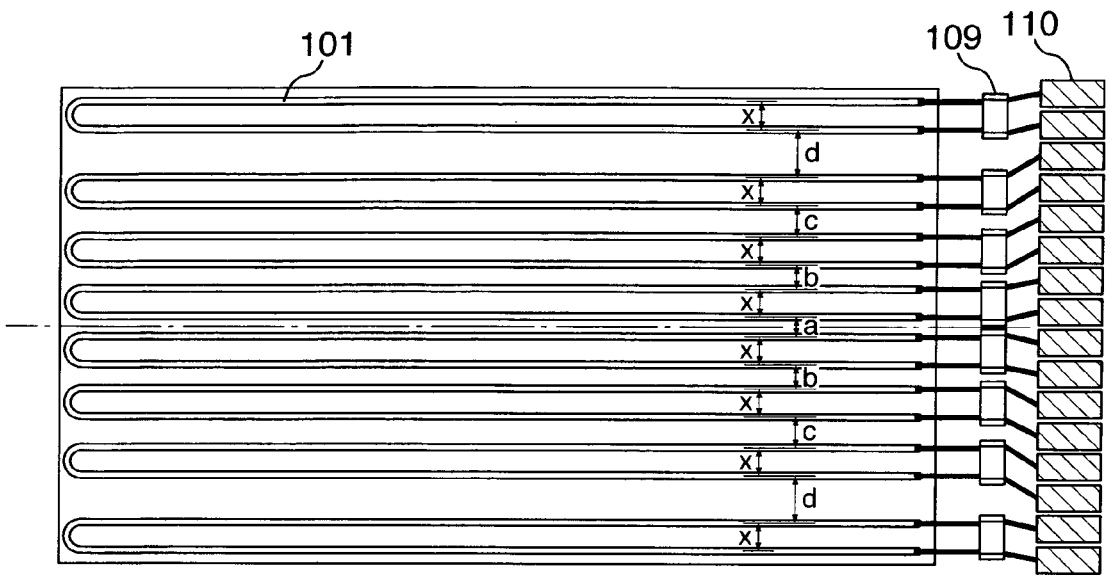
FIG. 16 is a top structural schematic view of a backlight module of the present invention.

The triangular sectional portion is disposed in the position of d which is the widest distance. By making the CFL distance between every two CFLs constant like this, each connecter 109 which supplies power voltage to the CFLs can be formed in a lump for every two CFLs as shown in FIG. 14, which is preferable since the number of components and operations can be reduced to half. This is especially preferable for the case of a pseudo U-shaped pipe with one sides of the CFLs 101 being short-circuited as shown in FIG. 15, and a U-shaped pipe as shown in FIG. 16.

In this case, the diffusing reflector may use a mold by resin or ceramics, or rings of various kinds of metals of which bottom surfaces are subjected to an insulating process. The one which is enhanced in reflectance by mixing a filler in the resin, or by having a fine layer composition is more preferable. Also, the one which is enhanced in reflectance by forming a thin metal film a surface of the resin or the ceramics by vapor deposition, plating, sputtering or the like may be used. For example, when forming it using a white resin material having high reflectance, the triangular sectional portion may be desirably formed in a desired position by a method such as an injection molding. The diffusing reflector may be configured by laying a sheet-shaped diffusing reflector in a casing.

In this case, it is possible to dispose the triangular sectional portion by folding the sheet-shaped diffusing reflector in a desired position.

Figure 18:
FIG. 18 is a sectional structural schematic view of a triangular sectional portion disposition part of a backlight module of the present invention.
Figure 18:
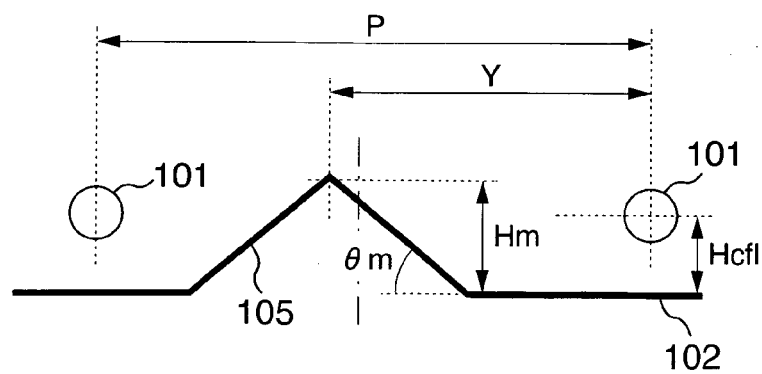

A preferable triangular sectional portion will be described using FIG. 18. The height Hm of the triangular sectional portion is preferably almost the same as the height Hcfl of CFL at its vertex, or a little higher than this. More specifically, the height Hm of the triangular sectional portion is set as follows with respect to the height Hcfl of the center of CFL from the diffusing reflector.

$$0.8 \text{ Hcfl} \leq \text{Hm} \leq 2.5 \text{ Hcfl}$$

Further, the inclination angle θm of the triangular sectional shape is preferably about 45 degrees or a little lower. More specifically, almost the following is preferable.

$$20 \text{ degrees} \leq \theta m \leq 50 \text{ degrees}$$

Figure 13:
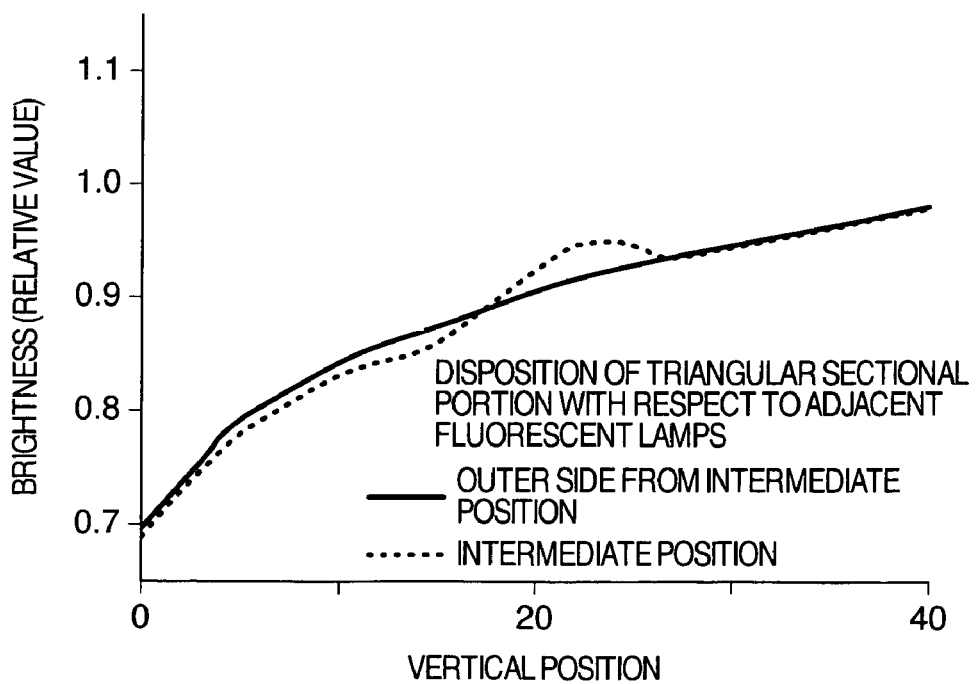
FIG. 13 shows brightness distribution characteristics of the backlight modules of the present invention.

In this case, the triangular sectional shapes on the center side near the center of the module and on the outer side far from the center may be the same as or different from each other. The position of the triangular sectional portion is preferably on the outer side from the intermediate portion between the adjacent CFLs. This is because the CFLs are present more on the center side of the triangular sectional portion, so that the amount of light irradiated to the triangular sectional portion becomes large, and a surface is irradiated upward by the light from an inner surface to improve lack of tube uniformity. As shown by a dotted line in FIG. 13, the brightness is intense on the center side and weak on the end portion side when the triangular sectional portion is located in the intermediate portion between the adjacent CFLs, so that the lack of brightness uniformity occurs. However, when the triangular sectional portion is disposed on the outer side from the intermediate portion, the brightness becomes weak on the center side, and becomes intense on the end portion side, so that the lack of brightness uniformity can be eliminated as shown by a solid line in the drawing. More specifically, a preferable range is shown as follows, where the distance between the adjacent CFLs 101 is set as P, and the distance from the center position of CFL on the center side to a vertex of the triangular sectional portion is set as y.

$$0.5P < y \leq 0.9P$$

Figure 19A:
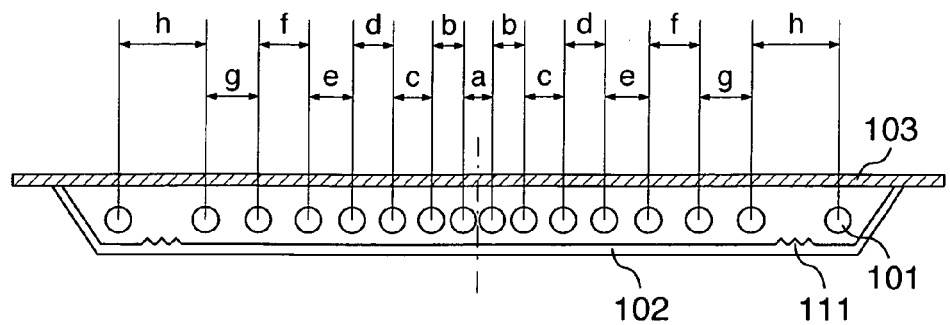
FIGS. 19A-19D are sectional structural schematic views of backlight modules of the present invention.
Figure 19B:
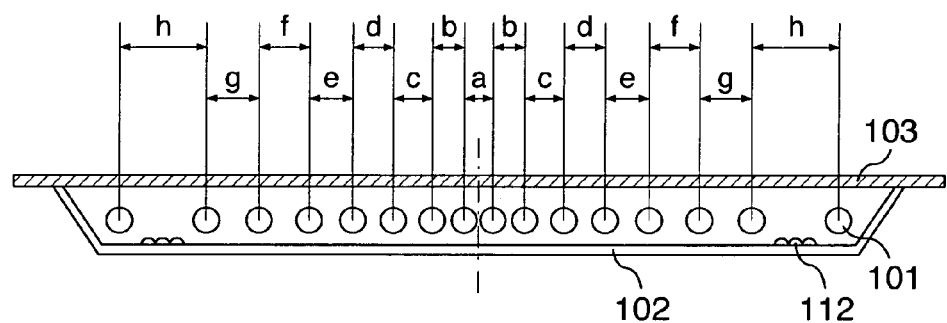
Figure 19C:
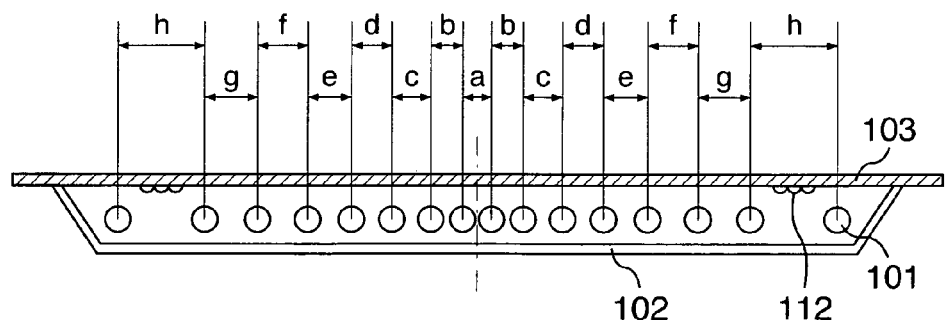
Figure 19D:
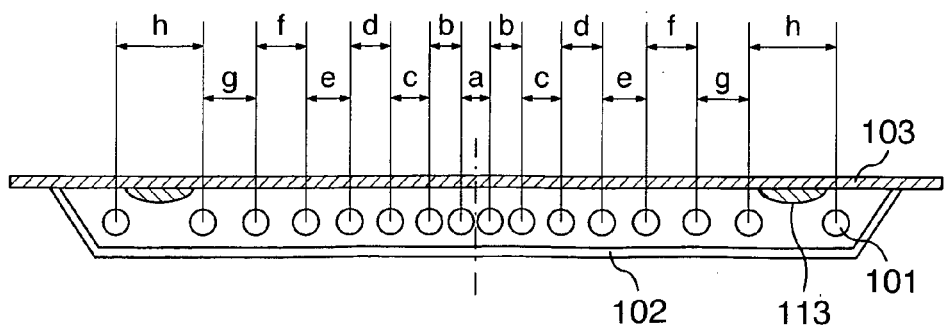

While the case where the triangular sectional projection structure is formed on the diffusing reflector between cold cathode fluorescent lamps with the widest distance disposed in an end portion of a plurality of cold cathode fluorescent lamps (CFLs) is described above, the gist of the present invention lies in that, in a backlight module having a plurality of cold-cathode fluorescent lamps (CFLs) and a diffusing reflector below those, the distance between the respective CFLs is arranged so as to be narrow in a central portion and wide in an end portion, and an optical component for relieving lack of brightness uniformity is provided only between CFLs with the widest distance therebetween disposed in the end portion. By gathering the optical components which relieve lack of brightness uniformity into one portion as described above, it is possible to obtain a desired effect such as enhancement in center brightness and reduction in CFL number with a minimum cost rise. In this case, the optical component for relieving lack of brightness uniformity may be the triangular sectional portion on the diffusing reflector 102 as described above. However, micro-prisms 111 may be provided in the widest distance as shown in FIG. 19A, or micro lenses 112 may be provided as shown in FIG. 19B to direct the light ray from the central portion upward to relieve lack of brightness uniformity. Further, the micro lenses 112 (as shown in FIG. 19C), and a diffuser 113 (as shown in FIG. 19D) may be provided on a corresponding portion of the diffuser panel 103. In this case, the diffuser 113 may be constant in thickness, but it is preferable for the diffuser 113 to gradually change in thickness as shown in FIG. 19D because the boundary between the diffuser 113 and a part with no diffuser 113 becomes inconspicuous, which is preferable.

Figure 17:
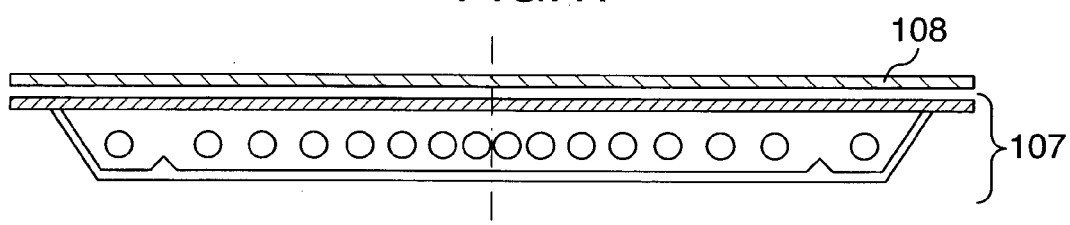
FIG. 17 is a sectional structural schematic view of a liquid crystal display of the present invention.

By combining the backlight module as described above and a panel which controls the light transmittance for each pixel of a liquid crystal panel or the like as shown in FIG. 17, a liquid crystal display can be obtained.

EXAMPLE 1

FIG. 8 shows a schematic view of the sectional structure of the backlight module of the present invention. A diffusing reflector sheet 106 which is a sheet-shaped diffusing reflector is laid in a casing 104 having a size of 32 inches and an opening height of 400 mm. In this case, the diffusing reflector is folded at two spots in upper and lower positions to form triangular sectional portion 105. Sixteen CFLs 101 are disposed therein, a diffuser panel 103 is mounted on a top of the casing, so that the backlight module is obtained. The backlight module is configured according to the following dimensions.

(1) CFL: Height Hcfl=4.7 mm, Fixed distance X=21.5 mm, Space a=18.5 mm, b=20 mm, c=21.5 mm, d=31.5 mm (2) Triangular shaped portion: Height Hm=6 mm, Width=20 mm, (Inclination angle θm=31 degrees), Position: 2.5 mm to the outer side from the intermediate portion of the CFLs (3) Diffusing Panel: Height=20 mm In this backlight module, the center brightness enhancement effect of 15% is obtained as compared with the case where the CFLs are uniformly disposed (X=a=b=c=d).

EXAMPLE 2

Figure 9:
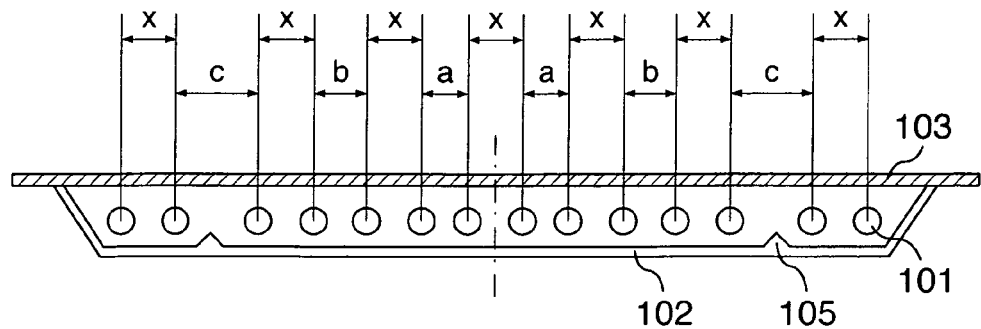
FIG. 9 is a sectional structural schematic view of a backlight module of the present invention.

FIG. 9 shows a schematic view of the sectional structure of a backlight module of the present invention. A casing-cum-diffusing reflector 102 is obtained from of white resin having a size of 32 inches and an opening height of 400 mm, by injection molding. In this case, the diffusing reflector forms the triangular sectional portions 105 at the two spots in the upper and lower positions. Fourteen CFLs 101 are disposed therein, the diffuser panel 103 is mounted on the top of the casing, so that the backlight module is obtained. The backlight module is configured according to the following dimensions.

(1) CFL: Height Hcfl=4.7 mm, Fixed distance X=25.5 mm, Space a=23 mm, b=25.4 mm, c=31.5 mm (2) Triangular shaped portion: Height Hm=6.6 mm, Width=15 mm, (inclination angle θm=41 degrees), Position: 2.5 mm to the outer side from the intermediate portion between the CFLs (3) Diffusing Panel: Height=20 mm In this backlight module, the number of the CFLs can be reduced by two as compared with Example 1, and the center brightness enhancing effect of 10% is obtained as compared with the case where the CFLs are uniformly disposed (X=a=b=c).

EXAMPLE 3

Figure 10:
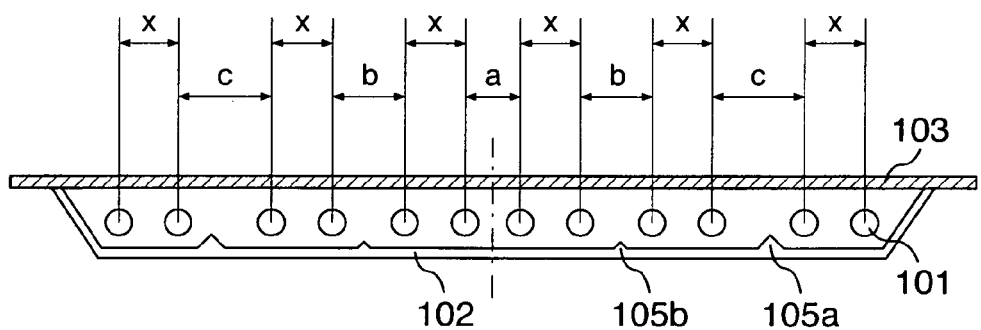
FIG. 10 is a sectional structural schematic view of a backlight module of the present invention.

FIG. 10 shows a schematic view of the sectional structure of a backlight module of the present invention. A casing-cum-diffusing reflector 102 is obtained from white resin having a size of 32 inches and an opening height of 400 mm, by injection molding. In this case, the diffusing reflector forms the triangular sectional portions 105 at two upper spots and two lower spots, namely, at the four spots in total. The height of the triangular sectional portions on the center side is small as compared with those on the outer side. Fourteen CFLs 101 are disposed therein, the diffuser panel 103 is mounted on the top of the casing, so that the backlight module is obtained. The backlight module is configured according to the following dimensions.

(1) CFL: Height Hcfl=4.7 mm, Fixed distance X=25.5 mm, Space a=25.5 mm, b=32.9 mm, c=41.0 mm (2) Triangular shaped portion:

Center side: Height Hm=3 mm, Width=16.5 mm, (inclination angle θm=20 degrees), Position: 2.5 mm to the outer side from the intermediate portion between the CFLs Outer side: Height Hm=7.5 mm, Width=15 mm, (inclination angle θm=45 degrees), Position: 2.5 mm to the outer side from the intermediate portion between the CFLs (3) Diffusing Panel: Height=20 mm In this backlight module, the number of the CFLs can be reduced by two as compared with Example 2 by providing the triangular sectional portions at the upper two spots and the lower two spots.

As described in detail above, according to the present invention, it becomes possible to achieve the desired object of enhancing the center brightness of a backlight module for a liquid crystal TV and a liquid crystal monitor without increasing power consumption, and of reducing the number of CFLs to thereby realize reduction in weight and in cost. Further, a similar effect can be obtained in a liquid crystal display using the module.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A backlight module comprising:
    a plurality of cold cathode fluorescent lamps (CFLs); and
    a diffusing reflector disposed below the plurality of cold cathode fluorescent lamps;
    wherein the distance between the respective cold cathode fluorescent lamps is arranged so that a central portion is narrow and an end portion is wide, and the backlight module includes a triangular sectional projection structure on the diffusing reflector only between the cold cathode fluorescent lamps between which the distance is the widest, in the end portion; and
    wherein a diffuser panel is disposed above the cold cathode fluorescent lamps and a substantially same distance is provided between each cold cathode fluorescent lamp and the diffuser panel.

2. The backlight module according to claim 1, wherein the triangular sectional projection structure is disposed on an outer side from a midpoint between the adjacent cold cathode fluorescent lamps.

3. The backlight module according to claim 1, wherein the diffusing reflector is formed by a sheet-shaped medium, and the triangular sectional structure is formed by folding the sheet-shaped medium.

4. The backlight module according to claim 1, wherein a substantially same distance is provided between each cold cathode fluorescent lamp and the diffusing reflector.

5. The backlight module according to claim 1, wherein a height of the triangular sectional projection structure on the diffusing reflector at its vertex is at least the same as a height of the cold cathode fluorescent lamps.

6. The backlight module according to claim 1, wherein a height Hm of the triangular sectional portion satisfies the following relational expression with respect to a height Hcfl of the center of the CFL from the diffusion reflector:

$$0.8\ Hcfl \leq Hm \leq 2.5\ Hcfl.$$

7. The backlight module according to claim 1, wherein an inclination angle θm of the triangular sectional shape of the triangular sectional portion satisfies the following relational expression:

$$20\ degrees \leq \theta m \leq 50\ degrees.$$

8. The backlight module according to claim 1, wherein the distance between the respective cold cathode fluorescent lamps is arranged so that a central portion is narrow, in an intermediary portion the distance between the CFLs is wider than the central portion and in an end portion the distance is the widest in relation to the central portion and the intermediary portion.

9. A backlight module comprising:
    a plurality of cold cathode fluorescent lamps (CFLs); and
    a diffusing reflector disposed below the plurality of cold cathode fluorescent lamps so that a substantially same distance is provided between the plurality of cold cathode fluorescent lamps and the diffusing reflector;
    wherein the distance between the respective cold cathode fluorescent lamps is arranged so that a central portion is narrow and an end portion is wide, and the backlight module includes triangular sectional projection structures on the diffusing reflector between the cold cathode fluorescent lamps between which the distance is the widest, and between the cold cathode fluorescent lamps between which the distance is the second widest, in the end portion, with no triangular sectional projection structures disposed on the diffusing reflector in the center portion; and
    wherein a diffuser panel is disposed above the cold cathode fluorescent lamps and a substantially same distance is provided between each cold cathode fluorescent lamp and the diffuser panel.

10. The backlight module according to claim 9, wherein a height of each triangular sectional projection structure on the diffusing reflector at its vertex is at least the same as a height of the cold cathode fluorescent lamps.

11. A backlight module, comprising
    a plurality of cold cathode fluorescent lamps (CFLs); and
    a diffusing reflector disposed below the plurality of cold cathode fluorescent lamps so that a substantially same distance is provided between the plurality of cold cathode fluorescent lamps and the diffusing reflector;
    wherein the distance between the respective cold cathode fluorescent lamps is arranged so that a central portion is narrow and an end portion is wide, and the backlight module includes triangular sectional projection structures on the diffusing reflector between the cold cathode fluorescent lamps in both end portions other than a center portion when a disposition area of the cold cathode fluorescent lamps is divided into three while the triangular sectional projection structure does not exist on the diffusing reflector in the center portion; and
    wherein a diffuser panel is disposed above the cold cathode fluorescent lamps and a substantially same distance is provided between each cold cathode fluorescent lamp and the diffuser panel.

12. The backlight module according to claim 11, wherein a height of the triangular sectional projection structure on the diffusing reflector at its vertex is at least the same as a height of the cold cathode fluorescent lamps.

13. The backlight module according to claim 11, wherein the distance between the respective cold cathode fluorescent lamps is arranged so that a central portion is narrow, in an intermediary portion the distance between the CFLs is wider than the central portion and in an end portion the distance is the widest in relation to the central portion and the intermediary portion.

14. A liquid crystal display comprising a liquid crystal panel and a backlight module, wherein
the backlight module comprises a plurality of cold cathode fluorescent lamps (CFLs), and a diffusing reflector disposed below the plurality of cold cathode fluorescent lamps, the distance between the respective cold cathode fluorescent lamps is arranged so that a central portion is narrow and an end portion is wide, and the liquid crystal display includes a triangular sectional projection structure on the diffusing reflector only between the cold cathode fluorescent lamps between which the distance is the widest, in the end portion, and
the back light module comprises a diffuser panel disposed above the cold cathode fluorescent lamps and a substantially same distance is provided between each cold cathode fluorescent lamp and the diffuser panel.

15. The liquid crystal display comprising a liquid crystal panel and a backlight module according to claim 14, wherein the backlight module is characterized in that the triangular sectional projection structure is disposed on an outer side from a midpoint between the adjacent cold cathode fluorescent lamps.

16. The liquid crystal display comprising a liquid crystal panel and a backlight module according to claim 14, wherein the backlight module is characterized in that the diffusing reflector is formed by a sheet-shaped medium and the triangular sectional structure is formed by folding the sheet-shaped medium.

17. The backlight module according to claim 14, wherein a substantially same distance is provided between each cold cathode fluorescent lamp and the diffusing reflector.

18. The backlight module according to claim 14, wherein a height Hm of the triangular sectional portion satisfies the following relational expression with respect to a height Hcfl of the center of the CFL from the diffusion reflector:

$0.8\ Hcfl \leq Hm \leq 2.5\ Hcfl$.

19. The backlight module according to claim 14, wherein an inclination angle $\theta m$ of the triangular sectional shape of the triangular sectional portion satisfies the following relational expression:

20 degrees $\leq \theta m \leq$ 50 degrees.

20. The backlight module according to claim 14, wherein the distance between the respective cold cathode fluorescent lamps is arranged so that a central portion is narrow, in an intermediary portion the distance between the CFLs is wider than the central portion and in an end portion the distance is the widest in relation to the central portion and the intermediary portion.

21. A liquid crystal display comprising a liquid crystal panel and a backlight module, wherein
the backlight module comprises a plurality of cold cathode fluorescent lamps (CFLs), and a diffusing reflector disposed below the plurality of cold cathode fluorescent lamps so that a substantially same distance is provided between the plurality of cold cathode fluorescent lamps and the diffusing reflector, the distance between the respective cold cathode fluorescent lamps is arranged so that a central portion is narrow and an end portion is wide, and the liquid crystal display includes triangular sectional projection structures on the diffusing reflector between the cold cathode fluorescent lamps between which the distance is the widest, and between the cold cathode fluorescent lamps between which the distance is the second widest, in the end portion, with no triangular sectional projection structures disposed on the diffusing reflector in the center portion, and
the back light module comprises a diffuser panel disposed above the cold cathode fluorescent lamps and a substantially same distance is provided between each cold cathode fluorescent lamp and the diffuser panel.

22. A liquid crystal display comprising a liquid crystal panel and a backlight module, wherein
the backlight module comprises a plurality of cold cathode fluorescent lamps, and a diffusing reflector disposed below the plurality of cold cathode fluorescent lamps (CFLs) so that a substantially same distance is provided between the plurality of cold cathode fluorescent lamps and the diffusing reflector, the distance between the respective cold cathode fluorescent lamps is arranged so that a central portion is narrow and an end portion is wide, the liquid crystal display includes triangular sectional projection structures on the diffusing reflector between the cold cathode fluorescent lamps in both end portions other than a center portion when a disposition area of the cold cathode fluorescent lamps is divided into three while the triangular sectional projection structure does not exist on the diffusing reflector in the center portion, and
the back light module comprises a diffuser panel disposed above the cold cathode fluorescent lamps and a substantially same distance is provided between each cold cathode fluorescent lamp and the diffuser panel.

23. The backlight module according to claim 22, wherein the distance between the respective cold cathode fluorescent lamps is arranged so that a central portion is narrow, in an intermediary portion the distance between the CFLs is wider than the central portion and in an end portion the distance is the widest in relation to the central portion and the intermediary portion.

* * * * *

UNITED STATES PATENT AND TRADEMARK OFFICE
CERTIFICATE OF CORRECTION

| | |
|---|---|
| PATENT NO. | : 7,710,515 B2 |
| APPLICATION NO. | : 11/527524 |
| DATED | : May 4, 2010 |
| INVENTOR(S) | : Ohshima et al. |

Page 1 of 1

It is certified that error appears in the above-identified patent and that said Letters Patent is hereby corrected as shown below:

On the title page item (73), change the Assignee from "Hitachi Display, Ltd., Mobara-shi (JP)" to --Hitachi Displays, Ltd., Mobara-shi (JP)--.

Signed and Sealed this

Second Day of November, 2010

David J. Kappos
*Director of the United States Patent and Trademark Office*